United States Patent [19]

Niccum

[11] 4,344,117
[45] Aug. 10, 1982

[54] SEARCHLIGHT REVERSING MECHANISM

[76] Inventor: Richard Niccum, 1554 W. 25th St., Upland, Calif. 91786

[21] Appl. No.: 186,239

[22] Filed: Sep. 11, 1980

[51] Int. Cl.³ ............................................. F21V 21/14
[52] U.S. Cl. ...................................... 362/250; 362/35; 362/210; 362/272; 362/285; 362/286; 362/287; 362/384
[58] Field of Search ................. 362/35, 210, 250, 272, 362/285, 286, 287, 384

[56] References Cited

U.S. PATENT DOCUMENTS

| | | | |
|---|---|---|---|
| 2,574,621 | 11/1951 | Chun | 362/272 |
| 2,954,771 | 10/1960 | Boyan | 362/272 |
| 4,298,911 | 11/1981 | Headrick | 362/272 |

*Primary Examiner*—Stephen J. Lechert, Jr.
*Attorney, Agent, or Firm*—Poms, Smith, Lande & Rose

[57] ABSTRACT

A drive mechanism for revolving the turret of a searchlight assembly. The turret is rotated in an oscillating manner over an arc of less than 360°. It is particularly characterized by smooth reversal allowing the driving of a high inertia turret without rapid motor overload and failure as characterized by other prior art methods of driving such mechanisms. A partial cylindrical track is concentrically disposed about the axis of rotation and attached to the turret. In the preferred embodiment, a link chain is welded along the bottom of the track, being folded back on the ends in a tear-drop shape. A drive sprocket on a swing arm is held into engagement with the chain and driven by a constant speed motor. The sprocket alternately drives along the inside of the chain and the outside of the chain smoothly traversing between the positions around the tear-drop ends to cause a smooth deceleration and acceleration.

9 Claims, 8 Drawing Figures

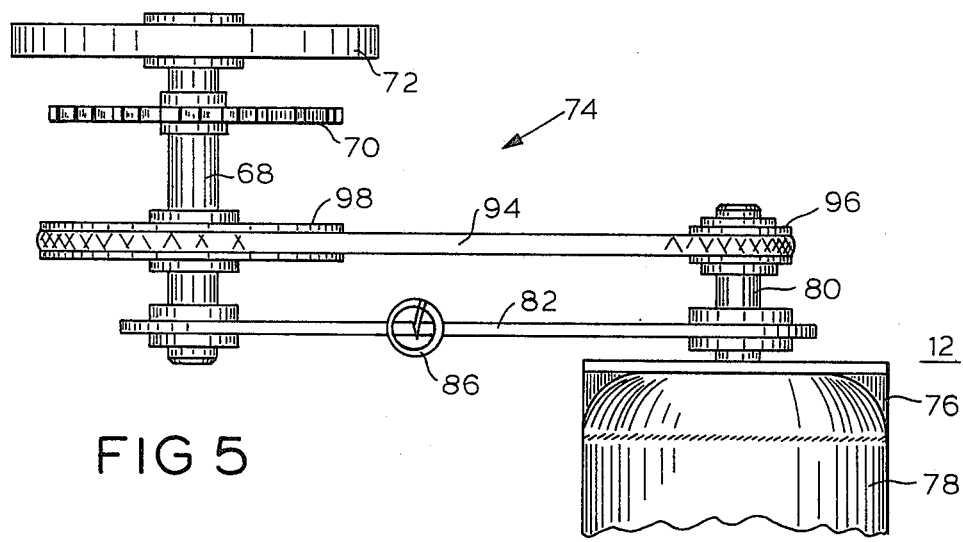
FIG 5
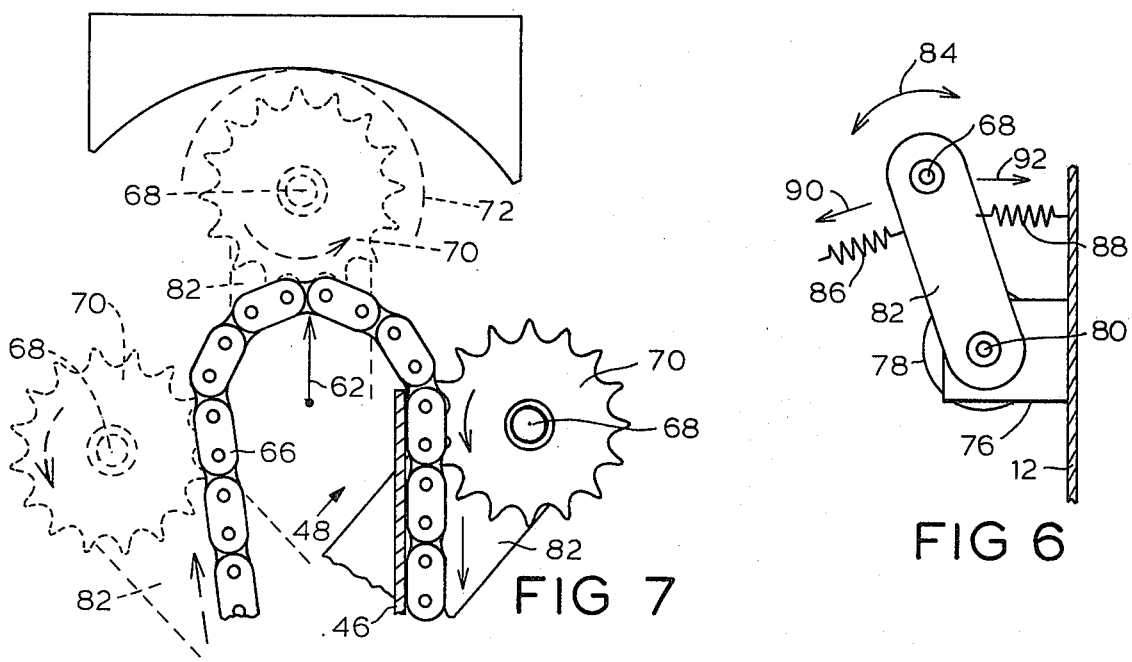
FIG 7
FIG 6
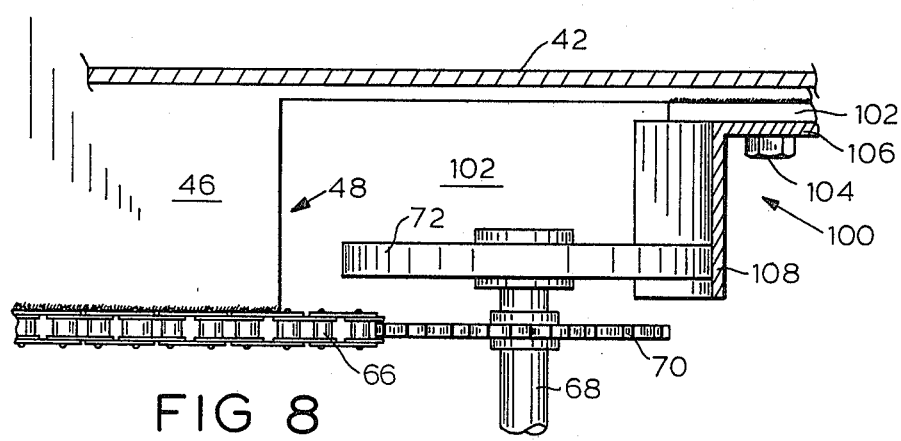
FIG 8

SEARCHLIGHT REVERSING MECHANISM

BACKGROUND OF THE INVENTION

The present invention relates to rotating searchlights and, more particularly, to drive mechanisms as employed therewith to cause the searchlight to rotate in an oscillating fashion.

Carbon-arc-type searchlights are well known to the general public in association with outdoor advertising. At night-time events at which it is desired to draw attention to a particular location from over a large viewing area, it is common to place a number of carbon-arc searchlights at the location and face them skyward. The lamps are then rotated causing a decorative and attention-getting pattern of light beams in the sky emanating from the location to which it is desired to draw attention. Such searchlights have been around for years, with the last actual construction thereof taking place somewhere around 1946.

Recently, the availability of high-intensity lamps has caused the construction of newer searchlight assemblies for use in such advertising making use of the technology which has been developed in the interim 35 years since the last carbon-arc searchlights were constructed. Such a unit as built by the applicant herein is shown in FIG. 1. As can be seen from the sequence displayed therein, the searchlight assembly, generally indicated as 10, comprises a base 12 which includes the necessary power supplies (not shown). A turret 14 is mounted on base 12 for rotation about an axis. One or more searchlights 16 containing high intensity lamps are mounted to the turret 14 for rotation therewith. As the turret 14 rotates in the horizontal plane about its vertical axis, the searchlights 16 are simultaneously and in unison rotated up and down in vertical planes giving the appearance of three light beams converging and then fanning out in a perfect pattern.

The high intensity lamps must have a constant power source connected thereto, as a momentary interruption will cause the lamp to be extinguished. Moreover, the power source is a high amperage D.C. current. Accordingly, it is not possible to rotate the turret 14 constantly in one direction with electric power supplied to the searchlights 14 through a slip-ring arrangement. Rather, a solid cable must be run from the searchlights 16 and the rotating turret 14 to the power supply contained within base 12. Accordingly, turret 14 must be rotated in an oscillating fashion.

In attempting to drive turret 14 in an oscillating manner, the applicant herein found that conventional drive mechanisms were either initially inoperative or soon failed. The turret 14 has a high mass and, therefore, a high inertia. By affixing a large ring gear to the turret, the turret could be driven by a spur gear engaged thereto being driven by a motor. By constantly reversing the motor, however, the high inertial forces soon caused the motor to burn out. Stepping motors, as tried, had their own set of problems, not the least of which was the high cost of the motor itself.

Wherefore, it is the object of the present invention to provide a drive mechanism for driving the turret of such searchlight assemblies in a smoothly oscillating manner with a mechanism having a low initial cost, high reliability, and long life expectancy.

SUMMARY

The foregoing objectives have been met by the mechanism of the present invention which comprises a partial cylindrical track member disposed concentrically about the axis of rotation of the turret and connected to the turret adjacent to the base. In the typical horizontally rotating turret rotating about a vertical axis, the track member extends vertically downward from the turret. The track member extends over an arc equal to the desired arc of oscillation. With this design, it is practical to achieve just under 360° of oscillation. The ends of the track member are tear-drop shaped in the plane of the track member to smoothly fold back upon themselves. The tear-drop shaped ends have a maximum radius of curvature such that a driving wheel engaging the track to rotate the turret thereby will be delayed a sufficient time in its transition from driving in one direction along the outside of the track to driving in the opposite direction along the inside of the track that the high inertia turret will be allowed to smoothly decelerate and then will be smoothly accelerated in the opposite direction.

A mounting assembly is attached to the base adjacent to the track and includes a swing arm attached at one end for rotation about an axis parallel to the turret axis. A drive shaft is journal mounted to the unattached end of the swing arm parallel to the turret axis. A drive wheel is mounted on the drive shaft to contact the track. A drive motor is attached to the mounting assembly and connected to rotate the drive shaft. A pair of springs are mounted to the base and connected to the swing arm, on opposite sides, to alternately bias the drive wheel against opposite sides of the track. Finally, a bias member is attached adjacent to each end of the track to hold the drive wheel in engagement therewith as it passes through the tear-drop shaped portion during the transition between one spring and the other spring holding it against the track.

In the preferred embodiment, the track comprises a strip of metal having a link chain welded along both sides of the bottom edge thereof. The drive wheel is in the shape of a sprocket having teeth adapted to engage the link chain. Additionally, an idler wheel is mounted concentrically with the sprocket to ride along the metal strip holding the sprocket in an ideal engagement position with the chain wherein the teeth thereof are drivingly engaged with the chain but not bottomed out, whereby chatter of the sprocket within the chain is eliminated and, thereby, a smoothly oscillating motion of the turret is achieved.

DESCRIPTION OF THE DRAWINGS

FIG. 5 is an elevation view of the drive mechanism of the present invention.

FIG. 6 is a simplified plan view of the swing arm portion of the present invention showing the biasing forces thereon.

FIG. 7 is a plan view of one end portion of the track of the present invention showing the transition of the sprocket from one side of the track to the other and the use of the bias member.

FIG. 8 is an elevation view of one end of the track of the present invention.

DESCRIPTION OF THE PREFERRED EMBODIMENT

Figure 1:
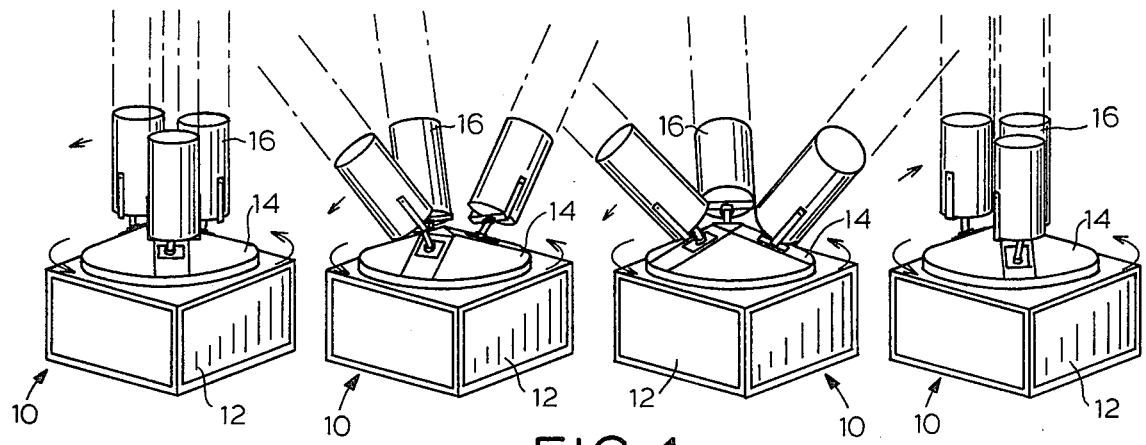
FIG. 1 is a simplified perspective view of a searchlight assembly as wherein the present invention is employed showing the combined motion of the searchlights achieved.
Figure 2:
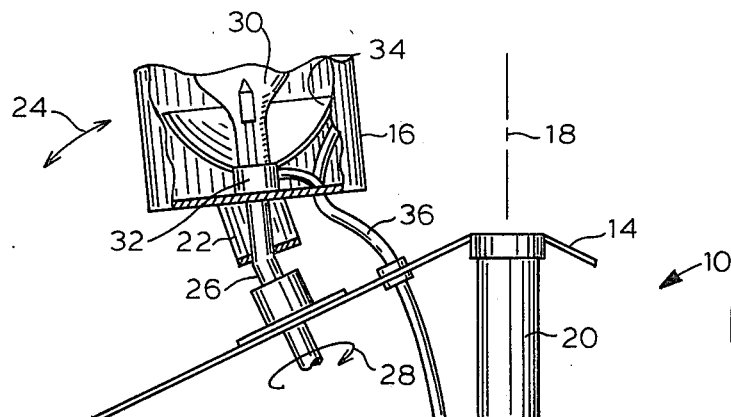
FIG. 2 is a simplified partially cutaway portion through a turret as wherein the present invention is employed.

Referring first to FIG. 2, the searchlight assembly 10 adjacent turret 14 is shown partially cutaway. As can be seen, turret 14 is mounted for rotation about vertical axis 18 as by journal-mounting on vertical axle 20. The searchlights 16 (shown in simplified form) are mounted to turret 14 by brackets 22 for rotation in a vertical plane as symbolized by the double-ended arrow 24. The searchlights 16 are driven in this vertical oscillating movement by a cranked arm 26 which is rotated, as symbolized by the arrow 28, by an appropriate drive mechanism (not shown) located within turret 14. Each searchlight 16 contains a high intensity lamp 30 positioned within a parabolic reflector 34 to create the light beam. Each lamp 30 is connected to a power source (not shown) within base 12 by cable 36. The base 12 comprises a box-like frame 30 having side panels 40 and a top panel 42 attached thereto.

To effect the driving mechanism of the present invention, top panel 42 has a circular opening 44 therein concentric with vertical axis 18. A cylindrical strip of metal 46 is welded along the top edge thereof to the bottom of turret 14. Metal strip 46 extends down from turret 14 through circular opening 44 in top panel 42.

Figure 3:
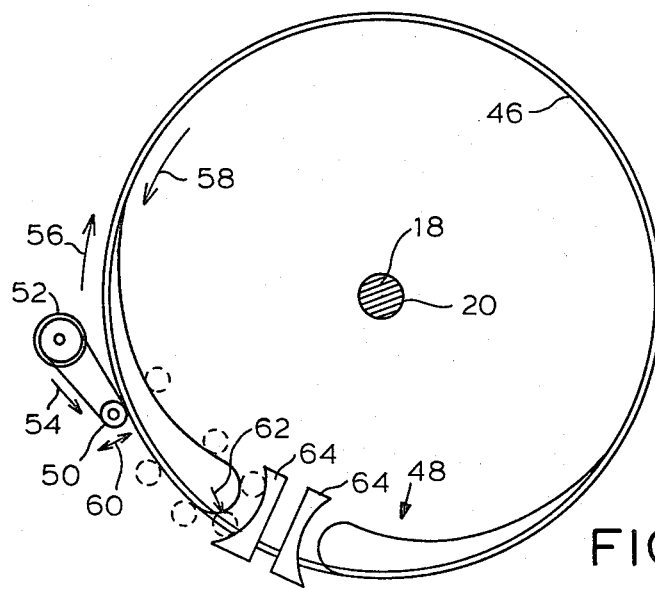
FIG. 3 is a simplified plan view showing the method of operation of the present invention.

Digressing briefly to FIG. 3, the principle of operation of the present invention is shown in simplified form therein. Assume that metal strip 46 as shown in plan view in FIG. 3 is part of a drive track. Assume further that a drive track, generally indicated as 48, is created incorporating metal strip 46 such that drive track 48 extends over the arc of oscillation desired and terminates in tear-drop shaped ends. If a drive wheel 50 being driven by a motor 52 is held tightly against drive track 48 and rotated in the direction of arrow 54, then as drive wheel 50 traverses the outside of drive track 48 the metal strip 46 (and turret 14 connected thereto) will be rotated in the clockwise direction as symbolized by arrow 56. As the drive wheel 50 traverses the inside of drive track 48, circular strip 44 (and turret 14 in combination therewith) will be driven in the counter-clockwise direction as symbolized by the arrow 58. Moreover, if the drive wheel 50 is free to rotate towards and away from axis 18 as symbolized by the double ended arrow 60 and, additionally, the radius of the tear-drop ends, as symbolized by the arrow 62, is properly chosen, and a bias member 64 is provided adjacent the tear-drop end to hold drive wheel 50 against drive track 48 during the transition from one side of the track to the other, a smooth transition can be effected between clockwise and counter-clockwise rotation.

If drive track 48 were to end abruptly and an attempt were made to immediately reverse direction, the inertia of turret 14 would cause problems as previously described. By making radius 62 large enough, a transition area is created wherein the forward driving force in one direction is tapered off, passes through zero, and then slowly accelerates in the opposite direction. By matching radius 62 and the speed of rotation of drive wheel 50 to the inertia characteristics of turret 14, a smooth transition imparting little strain on motor 52 can be effected.

Figure 4:
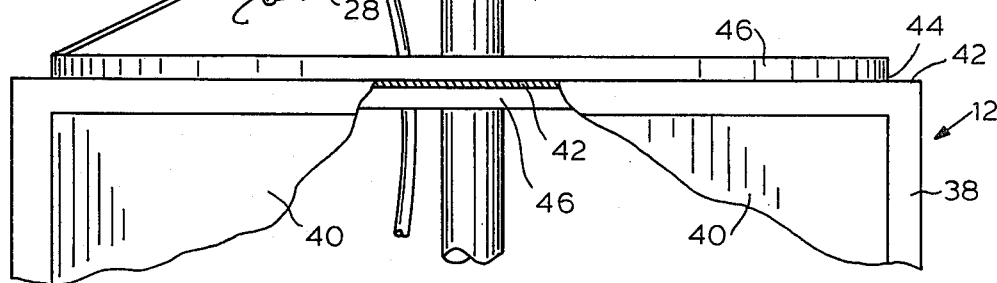
FIG. 4 is a cutaway elevation of the drive track and the sprocket of the present invention.
Figure 4:
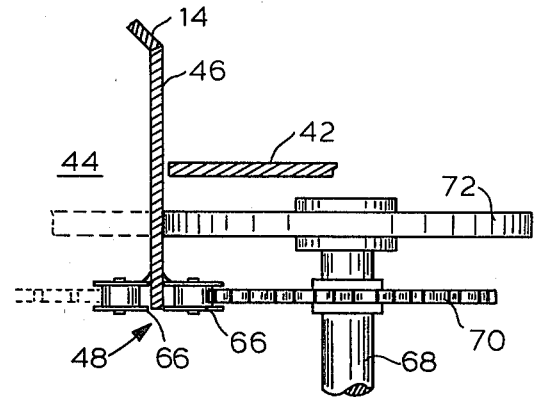

Turning now to FIG. 4, one aspect of the manner in which this has actually be implemented by the mechanism of the present invention in its preferred embodiment is shown. To form the drive track 48, a link chain 66 of the type used with motorcycles, bicycles, and the like, is welded on both sides of the bottom edge of metal strip 46. A vertical drive shaft 68 (to be discussed in greater detail hereinafter) is disposed adjacent the drive track 48. A sprocket 70 is mounted on shaft 68 with the teeth thereof positioned to engage the link chain 66. An idler wheel 72 is concentrically mounted on shaft 68 above sprocket 70 to ride along metal strip 46 as metal strip 46 (and turret 14) rotates. The radius of idler wheel 72 is chosen such as to force sprocket 70 out of full engagement with link chain 66, whereby the teeth of sprocket 70 are not bottomed out therein. Without idler wheel 72, it was found that sprocket 70 tended to jump and hop along link chain 66 causing an uneven driving force on turret 14. By holding sprocket 70 out of bottomed out engagement but in driving engagement with link chain 66 through the use of idler wheel 72, a smooth driving force is imparted into link chain 66 and, thereby, to turret 14.

Turning now to FIG. 5, the full driving mechanism, generally indicated as 74, is shown. It is to be understood that the configuration shown is merely representative of numerous ways in which the desired effects can be achieved. An L-shaped mounting bracket 76 is attached to base 12. Electric motor 78 is mounted to bracket 76 with the output shaft 80 thereof vertically disposed. A swing arm 82 is concentrically journal-mounted at one end about shaft 80 for rotation in the horizontal plane around shaft 80. This is shown in simplified form in plan view in FIG. 6. Once again, as shown therein, swing arm 82 is free to rotate in the horizontal direction, as indicated by the double-ended arrow 84, about output shaft 80. A pair of springs 86, 88 are attached to opposite sides of swing arm 82 and from there to appropriate points on base 12. Springs 86, 88 are used to provide a bias force holding the sprocket 70 into engagement with the link chain 66 through the majority of travel of turret 14. When swing arm 82 is pushed in the direction of arrow 90, spring 88 produces a biasing force in the direction of arrow 92. Likewise, when swing arm 82 is forced in the direction of arrow 92, spring 86 will produce a restorative force in the direction of arrow 90.

Returning now with particularity to FIG. 5, the drive shaft 68 can be seen to be journal-mounted to the opposite end of swing-arm 82. Drive shaft 68 is driven by a V-belt 94 disposed about a first pulley 96 mounted on output shaft 80 of electric motor 78 and a second pulley 98 mounted on drive shaft 68.

Turning now to FIGS. 7 and 8, the transition which occurs at the end of the track 48 to effect smooth reversal will be addressed. As shown in the solid lines of FIG. 7, sprocket 70 is driving turret 14 in the clockwise direction. Spring 86 is holding sprocket 70 in engagement with link chain 66. Upon reaching the end of strip 46, link chain 66 is curved around a maximum radius as indicated by the arrow 62 and thereafter tapers in tear-drop design back towards the inner edge of metal strip 46. It should be noted at this point that in the areas of the tear-drop ends of track 48 where the link chain 66 is not welded to the strip 46, the links of chain 66 are welded to one another to maintain link chain 66 rigid in its desired shape. Once sprocket 72 is fully around radius 62, sprocket 70 is held into engagement with link chain 66 by spring 88. During the transition, however, provision must be made to maintain sprocket 70 in engagement with link chain 66, or else it is possible that by inertia, turret 14 will move link chain 66 away from sprocket 70 and out of engagement therewith. This, of course, would stop the motion of turret 14 or, in the alternative, would cause turret 14 to continue rotation in the same direction thereby tangling electrical cable 36 should sprocket 70 manage to come into engagement with link chain 66 on the opposite side of the gap between the two ends of track 48. To prevent these undesirable happenings, biasing member 100 is provided to contact idler wheel 72 and smoothly guide sprocket 70 in the transition between biasing by spring 88 and by spring 86.

The construction of the ends of track 48 and biasing member 100 can best be seen in FIG. 8. Each end of track 48 is substantially identical so that only one is shown for greater size and clarity of detail. At the end of the track 48, the metal strip 46 contains a notch 102 which extends to the beginning of the other end of track 48. A horizontal plate 102 is welded to strip 46 at the top of notch 102 adjacent the end of track 48. A pair of bolts 104 are threadedly engaged into plate 102. Biasing member 100 is in the form of a horizontal plate 106 held against horizontal plate 102 by bolts 104 passing through slots (not shown) therein. A curved biasing plate 108 extends downward from plate 106. Curved biasing plate 100 is curved and sized to receive idler wheel 72 and smoothly guide it around the end of track 48. By providing the slots in plate 106, the position of biasing member 100 can be accurately adjusted to the desired position. This same provision at the ends of the track would, of course, be necessary even if the chain 66 and sprocket 70 were replaced by a smooth track and rubber covered engagement wheel which, though not preferred, are within the scope of the present invention.

Wherefore, from the foregoing description, it can be seen that the drive mechanism of the present invention has achieved the desired results of providing a simple, low-cost, reliable, and maintenance-free drive mechanism for driving the high inertia turret of a modern searchlight assembly smoothly over an arc of oscillation of almost 360°.

I claim:

1. In a searchlight assembly having a turret including one or more searchlights mounted thereon and carried by a base member for rotation about a turret axis to rotate the searchlights, the improved mechanism for smoothly revolving the turret in an oscillating pattern of less than 360° arc comprising:
   (a) a partial cylindrical track member disposed concentrically about the turret axis and connected to the turret adjacent the base member, said track member extending over an arc equal to the desired arc of oscillation, the ends of said track member being tear-drop shaped in the plane of said track member to smoothly fold back upon itself, said tear-drop shaped ends each having a maximum radius of curvature such that a driving wheel engaging said track to rotate said turret thereby will be delayed in the transition between driving in one direction and the other a sufficient time to allow the turret to smoothly decelerate and then smoothly accelerate the turret in the opposite direction;
   (b) a mounting assembly carried by the base member adjacent said member track and including a swing-arm attached at one end for rotation about an axis parallel to the turret axis;
   (c) a drive shaft journal-mounted to the unattached end of said swing-arm parallel to the turret axis;
   (d) a drive wheel mounted on said drive shaft to contact said track;
   (e) drive motor means mounted to said mounting assembly for rotating said drive shaft;
   (f) first bias means attached to said swing-arm for holding said drive wheel against said track when said drive wheel is on the side of said track towards the turret axis;
   (g) second bias means attached to said swing-arm for holding said drive wheel against said track when said drive wheel is on the side of said track away from turret axis; and,
   (h) means for holding said drive wheel against said track in the tear-drop shaped portions during the transition between said first and second bias means holding said drive wheel against said track.

2. The searchlight drive mechanism of claim 1 wherein:
   (a) said track member comprises a strip of metal attached to the turret along one edge and having a link chain attached on opposite sides of the other edge; and,
   (b) said drive wheel is a sprocket having teeth adapted to engage said chain.

3. The searchlight drive mechanism of claim 2 and additionally comprising:
   an idler wheel mounted concentrically with said sprocket and sized and positioned to roll along said metal strip holding said sprocket away from said chain a sufficient distance that the teeth of said sprocket are in driving engagement with said chain links but not bottomed out therein whereby jumping of said sprockets accompanied by unsmooth driving of the turret is eliminated.

4. In a searchlight assembly having a turret including one or more searchlights mounted thereon and carried by a base member for rotation about a turret axis, the improved mechanism for smoothly oscillating the turret about the turret axis through an arc of less than 360° comprising:
   (a) a track member connected to the turret adjacent the base member concentric with the turret axis and extending over an arc equal to the desired arc of oscillation, the ends of said track member being tear-drop shaped in the plane of said track member to smoothly fold back upon itself;
   (b) a mounting assembly carried by the base member adjacent said track member;
   (c) a drive shaft journal-mounted to said mounting assembly by means for holding said drive shaft parallel to the turret axis and for allowing said drive shaft to be moved towards and away from the turret axis;
   (d) a drive wheel mounted on said drive shaft to contact said track;
   (e) drive motor means operably connected to rotate said drive wheel; and,
   (f) bias means for holding said drive wheel in driving engagement with said track member.

5. The searchlight drive mechanism of claim 4 wherein:
   said tear-drop shaped ends of said track each have a maximum radius of curvature such that said driving wheel is delayed in the transition between driving the turret in one direction and driving it in the other direction by traversing the tear-drop end a sufficient time to allow the turret to smoothly decelerate and then smoothly accelerate in the opposite direction despite high mass and associated inertia of the turret.

6. The searchlight drive mechanism of claim 4 wherein said bias means comprises:
   (a) a first spring bias member connected to said drive shaft holding means for holding said drive wheel against said track when said drive wheel is on the side of said track towards the turret axis;
   (b) a second spring bias member connected to said drive shaft holding means for holding said drive wheel against said track when said drive wheel is on the side of said track away from the turret axis; and,
   (c) means for holding said drive wheel against said track in the tear-drop shaped portion during the transition between said first and second spring bias members holding said drive wheel against said track.

7. The searchlight drive mechanism of claim 4 wherein:
   (a) said track member comprises a strip of metal attached to the turret along one edge and having a link chain attached on opposite sides of the other edge; and,
   (b) said drive wheel is a sprocket having teeth adapted to engage said chain.

8. The searchlight drive mechanism of claim 7 and additionally comprising:
   an idler wheel mounted concentrically with said sprocket and sized and positioned to roll along said metal strip holding said sprocket away from said chain a sufficient distance that the teeth of said sprocket are in driving engagement with said chain links but not bottomed out therein whereby jumping of said sprocket accompanied by unsmooth driving of the turret is eliminated.

9. The searchlight drive mechanism of claim 8 wherein said bias means comprises:
   (a) a first spring bias member connected to said drive shaft holding means for holding said drive wheel against said track when said drive wheel is on the side of said track towards the turret axis;
   (b) a second spring bias member connected to said drive shaft holding means for holding said drive wheel against said track when said drive wheel is on the side of said track away from the turret axis; and,
   (c) means for contacting said idler wheel to said drive wheel against said track in the tear-drop shaped portions during the transition between said first and second spring bias members holding said drive wheel against said track.

* * * * *